United States Patent
Tinn et al.

(10) Patent No.: US 7,298,921 B2
(45) Date of Patent: Nov. 20, 2007

(54) DOCUMENT SCANNING METHOD AND DOCUMENT SCANNER

(75) Inventors: Graham James Ohn Tinn, Offord Cluny (GB); Andrew Roy Cullum, Dry Drayton (GB); Andrew John Melvin, Bedworth (GB)

(73) Assignee: Colortrac Limited, Cambridgeshire (GB)

( * ) Notice: Subject to any disclaimer, the term of this patent is extended or adjusted under 35 U.S.C. 154(b) by 821 days.

(21) Appl. No.: 10/353,508

(22) Filed: Jan. 29, 2003

(65) Prior Publication Data

US 2004/0146218 A1 Jul. 29, 2004

(51) Int. Cl.
G06K 9/32 (2006.01)
G06K 9/64 (2006.01)
G06K 9/00 (2006.01)

(52) U.S. Cl. ............... 382/294; 382/278; 382/293; 382/318

(58) Field of Classification Search ............... 382/278, 382/318, 293, 294
See application file for complete search history.

(56) References Cited

U.S. PATENT DOCUMENTS

| | | | | |
|---|---|---|---|---|
| 4,282,546 A | * | 8/1981 | Reitmeier | 348/580 |
| 5,675,672 A | * | 10/1997 | Nakabayashi | 382/318 |
| 2002/0051573 A1 | * | 5/2002 | Sakai et al. | 382/194 |

* cited by examiner

Primary Examiner—Matthew C. Bella
Assistant Examiner—Wes Tucker
(74) Attorney, Agent, or Firm—Barnes & Thornburg LLP

(57) ABSTRACT

A document scanning method comprises causing relative movement between a document and first and second imaging elements, such that each of a succession of scan lines of the document is exposed in turn to the imaging elements; generating first and second image data words representative of overlapping portions of each scan line; and concatenating at least a portion of the words to generate a third word representative of the scan line, the method being characterised by the steps of cross-correlating at least a portion of each of the words to identify a portion of the second word that is included in the first word; discarding a portion of at least one of words; concatenating the first word or remainder thereof with the second word or remainder thereof to form the third word; and, if necessary, compressing or expanding the third word by linear interpolation so as to obtain a word of a predetermined length.

8 Claims, 2 Drawing Sheets

DOCUMENT SCANNING METHOD AND DOCUMENT SCANNER

FIELD OF THE INVENTION

This invention relates to a document scanning method and to a document scanner that is operable to implement the document scanning method.

BACKGROUND TO THE INVENTION

Large format document scanners, i.e. those for scanning documents of widths greater than approximately 11 inches, employ a plurality of imaging elements. The imaging elements are so arranged that, in use, each element generates image data representative of a portion of a scan line of a document. Each portion of the scan line has a slight overlap with one to two other portions, dependent on whether the portion is from an end or the middle of the scan line. In a known method of generating image data representative of the entire scan line from the image data from a plurality of imaging elements, an initial and/or terminal portion of the image data from each imaging element, corresponding to the slight overlap or overlaps, is discarded, and the remainders of the image data are concatenated with one another.

The known method assumes that a distance from the document to the imaging elements is constant, and that the slight overlaps of the portions of the scan line are therefore also constant, and an initial and/or terminal portion of a predetermined length of the image data from each element is discarded. However, due to imperfections of a process by which the document is moved relative to the imaging elements or vice versa, or due to imperfections of the document itself, such as folds that cannot be completely flattened, the distance from the document to the imaging elements, and hence the slight overlaps of the portions of the scan line, are variable. If the distance from the document to the imaging elements increases, discarding a portion of the image data of the predetermined length results in duplication of data in the image data representative of the entire scan line, and hence duplication of some portions in a resulting image of the scan line. Where the distance from the document to the imaging elements decreases, discarding a portion of the image data of the predetermined length results in deletion of data from the image data representative of the entire scan line, and hence, omission of some portions in a resulting image of the scan line. FIG. 1 of the attached drawing figures illustrates the effects of variation of distance from the document to the scanning elements when the known document scanning method is employed.

SUMMARY OF THE INVENTION

According to a first aspect of the invention there is provided a document scanning method comprising the steps of causing relative movement between a document and first and second imaging elements, such that each of a succession of scan lines of the document is exposed in turn to the imaging elements; generating by means of the first and second imaging elements respective first and second image data words representative of respective first and second overlapping portions of each scan line; and concatenating at least a portion of each of the first and second words to generate a third image data word representative of the scan line, the method being characterised by the steps of cross-correlating at least a portion of each of the first and second words to identify a portion of the second word that is included in the first word; discarding a portion of at least one of the first and second words; concatenating the first word or remainder thereof with the second word or remainder thereof to form the third image data word; and, if necessary, compressing or expanding the third word by linear interpolation so as to obtain an image data word of a predetermined length.

It should be noted that, as used herein, the term "word" is not intended to apply solely to 4 bits of data (which is one specific meaning of the term to those skilled in the art) but instead encompasses a packet of data of any size.

The invention therefore provides a document scanning method that compensates for variations in a distance from a document to the image elements.

The term "document" as used herein, refers to anything bearing text and/or images on a medium. The medium may comprise any suitable material, such as paper, canvas, card, or metal. It will be apparent that a "document" is not limited to things on which text and/or images are applied by printing: text and/or images could be formed by any suitable process (e.g. etching, stamping, embossing, painting etc.).

The step of cross-correlating at least a portion of each of the first and second words may advantageously consist of cross-correlating a terminal portion of the first word with an initial portion of the second word, said terminal portion of the first word and initial portion of the second word including image data representative of an overlap of the first and second overlapping portions of a scan line.

In this way the cross-correlation is simplified and can therefore be accomplished more quickly and with a reduced likelihood of spurious correlation.

Preferably the steps of discarding a portion of at least one of the first and second words and concatenating the first word or remainder thereof with the second word or remainder thereof to form the third image data word consist of discarding a terminal portion of the first word and an initial portion of the second word, said terminal portion of the first word being substantially representative of a first half of the overlap of the first and second overlapping portions of the scan line, and said initial portion of the second word being substantially representative of a second half of the overlap of the first and second overlapping portions of the scan line, and concatenating the remainder of the first word with the remainder of the second word to form the third image data word.

The terminal portion of the first word and the initial portion of the second word include image data obtained from the extremities of the fields of view of the imaging elements, and are more likely to contain errors than data obtained from nearer to the centres of the fields of view of the imaging elements. By discarding these portions, the likelihood of introducing errors into the third image data word is reduced.

Preferably the method further comprises the step, after identifying the portion of the second word that is included in the first word, of determining whether the length of said portion exceeds a predetermined value, which indicates that a spurious correlation has occurred, and if so, discarding a portion of at least one of the first and second words of a default length.

In a preferred embodiment of the invention, the method further comprises the steps, after identifying the portion of the second word that is included in the first word and determining that the length of said portion does not exceed the predetermined value, of subtracting the length of said portion from said default length to generate an offset value, determining a running average of the offset value and the offset values of any preceding scan lines, rounding the running average to the nearest integer, if necessary, and discarding a terminal portion of the first word and an initial portion of the second word of a length equal to one half of the sum of the rounded running average and default length.

It is to be understood that where it is determined that the length of the portion of the second word that is included in the first word exceeds the predetermined value, the offset value for that scan line is zero, since a spurious correlation must have occurred.

The step of discarding the terminal portion of the first word and initial portion of the second word of a length equal to one half of the sum of the rounded running average and the default length makes scan lines in which a spurious correlation has occurred less conspicuous in a resulting image of the document.

According to a second aspect of the invention there is provided a document scanner having first and second imaging elements, a scanning mechanism and a microprocessor, the microprocessor being operable to control the scanning mechanism and process image data from the first and second imaging elements to perform a document scanning method according to the first aspect of the invention.

The first and second imaging elements are typically linear-array contact image sensors or charge coupled device—(CCD) based cameras.

The scanning mechanism may be either an arrangement of rollers by means of which a document may be moved relative to the imaging elements (a so-called sheet-feed arrangement) or an arrangement by means of which the imaging elements are moved relative to a document (a so-called flatbed arrangement).

The microprocessor may advantageously be contained in the document scanner.

In a preferred embodiment of the invention, however, the microprocessor forms part of a programmed computer and the document scanner is operable to transmit the first and second words from the imaging elements to the computer and to receive the third image data words and control data from the computer.

BRIEF DESCRIPTION OF DRAWINGS

The invention will now be described in more detail and by way of illustrative example with reference to the attached drawing figures, in which.

DETAILED DESCRIPTION OF AN EMBODIMENT

Figure 1:
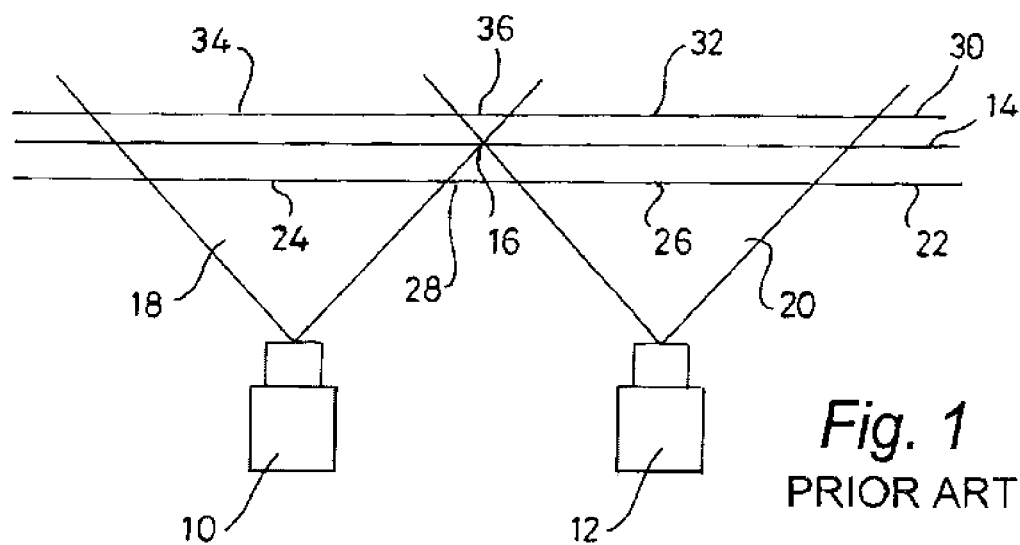
FIG. 1 is a schematic diagram showing the effects of variation of distance from a document to the imaging elements of a document scanner when the known document scanning method is employed.

FIG. 1 shows first and second linear-array CCD-based cameras 10 and 12 respectively. The first camera 10 generates a first image data word representative of a first portion of a scan line of a document and the second camera 12 generates a second image data word representative of a second, overlapping portion of the scan line. In the known method it is assumed that the document is always at a position 14, and a terminal portion of the first word and an initial portion of the second word are discarded, the discarded portions of the words corresponding to the overlap of the first and second portions of the scan line, and the remainders of the first and second words are concatenated to generate an image data word representative of two contiguous portions of the scan line. This is illustrated by the intersection 16 of the respective effective fields of view, 18 and 20, of the first and second cameras.

If, however, the document is in fact at a position 22, which is closer to the cameras than the assumed position 14, and the same terminal portion of the first word and initial portion of the second word are discarded, the discarded portions will correspond to a portion of the scan line longer than the overlap of the first and second portions of the scan line. The image data word resulting from the concatenating the remainders of the first and second words will be representative of two discontinuous portions of the scan line. These discontinuous portions are denoted in FIG. 1 by reference numerals 24 and 26. A portion of the scan line between the two discontinuous portions, denoted in FIG. 1 by reference numeral 28, will fall outside the effective fields of view 18 and 20 of the cameras, and will be omitted from the image data word.

If, on the other hand, the document is in fact at a position 30, which is further from the cameras than the assumed position 14, and the same terminal portion of the first word and initial portion of the second- word are discarded, the discarded portions will correspond to a portion of the scan line shorter than the overlap of the first and second portions of the scan line. The image data word resulting from concatenating the remainders of the first and second words will include data representative of two slightly overlapping portions of the scan line. These overlapping portions are denoted in FIG. 1 by reference numerals 32 and 34, with their overlap denoted by reference numeral 36, which falls within the effective fields of view 18 and 20 of both cameras, and will be duplicated in the image data word.

Figure 2:
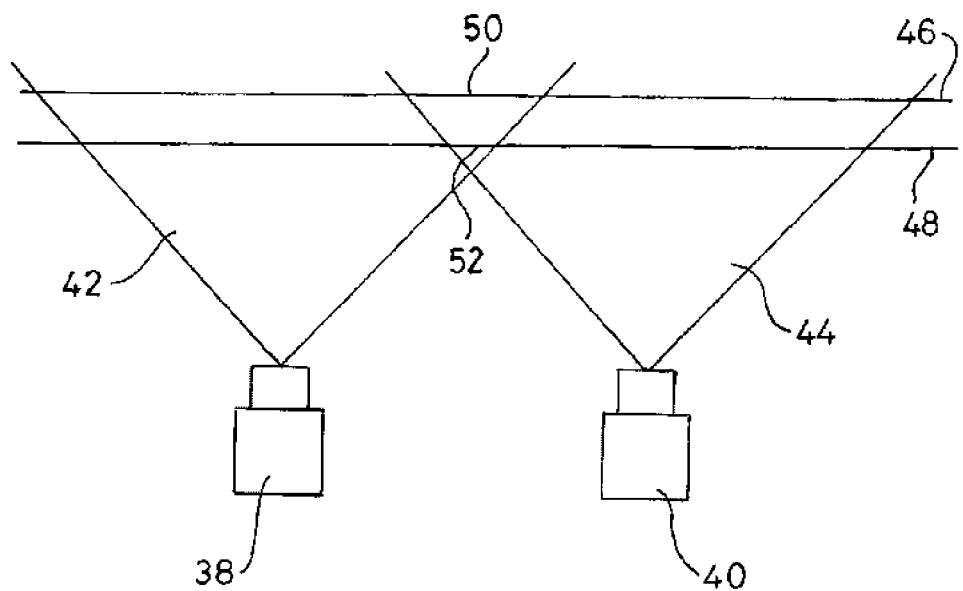
FIG. 2 is a schematic diagram showing the effects of variation of distance from the document to the imaging elements when a method in accordance with the first aspect of the invention is employed.

FIG. 2 shows first and second linear-array CCD-based cameras 38 and 40, which have respective actual fields of view 42 and 44. A document can take any position from a far position 46 from the cameras to a near position 48 to the cameras. Whether in the far position 46 or the near position 48, or anywhere between, in the method of the invention there is always an overlap of the actual fields of view of the cameras. The overlaps of the actual fields of view of the cameras with respect to the far and near positions 46 and 48 of the document are denoted in FIG. 2 by reference numerals 50 and 52 respectively.

The method of the invention is as follows:

For each scan line of the document, a microprocessor, which, in the preferred embodiment of the second aspect of the invention, forms part of a programmed computer to which the document scanner is connected, receives first and second image data words A and B from respective first and second CCD-based cameras of a document scanner.

Each image data word consists of a large number of data units, each of which corresponds to a pixel of the scan line. The microprocessor selects a data unit A_END from data word A and a data unit B_START from data word B. A_END and B_START correspond to the last and first data units of the remainders of data words A and B respectively, if predetermined portions of data words A and B were to be discarded in accordance with the known document scanning method, i.e. assuming that the distance from the document to the imaging elements is constant.

The microprocessor cross-correlates a portion of data word A from unit A−25 to unit A+25 with a portion of data word B from unit B−25+p to B+25+p for values of p from −15 to +15, using the sum of the squares of the differences of the portions from data words A and B.

The value of p that gives the smallest sum of the squares of the differences is stored by the microprocessor for each scan line. A negative value of p represents the number of pixels that would have been omitted from the scan line if the known document scanning method had been used, while a positive value of p represents the number of pixels that would have been duplicated in the scan line if the known document scanning method had been used.

The microprocessor calculates a running average of the value of p for the scan line and for any preceding scan lines, then rounds the running average for the scan line to the nearest integer, p_real. The use of the running average p_real rather than p itself makes the effects of any spurious correlations on the image resulting from the image data less conspicuous.

If p_real is zero, then the terminal portion of data word A from A_END+1 onwards is discarded, and the initial portion of data word B up to B_START−1 is discarded, and the remainders of words A and B are concatenated, such that B_START follows A_END. No further processing is necessary for the scan line.

If p_real is negative, then the terminal portion of data word A from A_END+1 onwards is discarded, and the initial portion of data word B up to B_START−1+p_real is discarded. Data compression is used to compress the portion of the remainder of data word B from B_START+p_real to B_START+25 to 26 data units. The remainder of data word A and the compressed remainder of data word B are concatenated, such that B_START+p_real follows A_END.

If p_real is positive, then the terminal portion of data word A from A_END+1 onwards is discarded, and the initial portion of data word B up to B_START−1+p_real is discarded.

Linear interpolation is used to expand the portion of the remainder of data word B from B_START+p_real to B_START+25 to 26 data units. The remainder of data word A and the expanded remainder of data word B are concatenated, such that B_START follows A_END.

The foregoing description relates to a document scanning method that uses only two imaging elements. The method can, however, be extended to use three or more imaging elements. In that case, the microprocessor would receive a third or subsequent data word C, select a data unit B_END in data word B and a data unit C_START in data word C, and apply the method as set out above in respect of data words A and B.

The cross-correlation of the terminal and initial portions of data words B and C would not be affected by any compression or expansion of data word B, because the compression or expansion affects only the initial portion of data word B.

Figure 3:
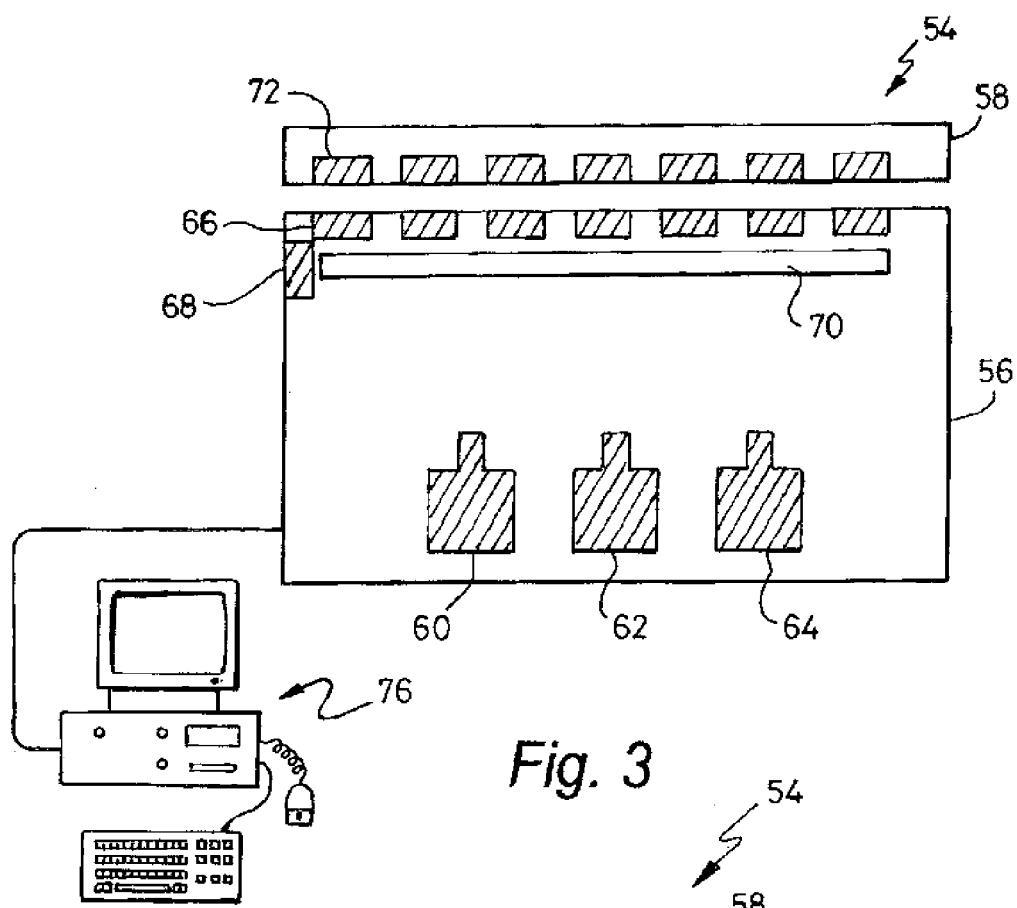
FIGS. 3 and 4 are front and side sectional views, respectively, of a document scanner in accordance with the second aspect of the invention.
Figure 4:
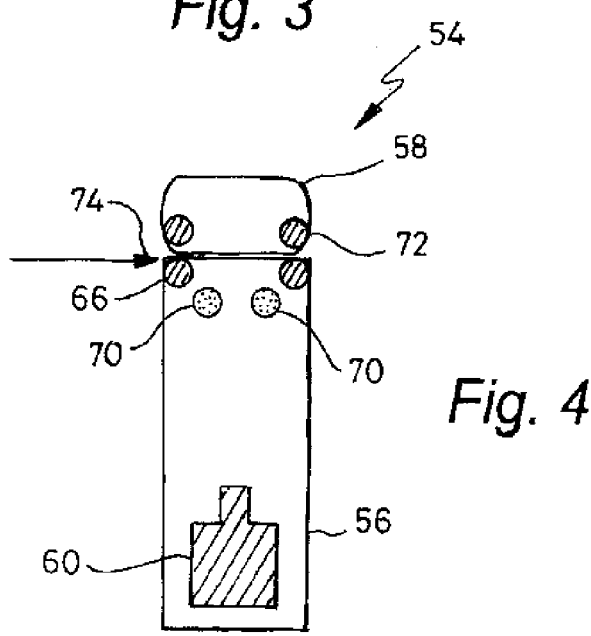

Turning to FIGS. 3 and 4, a sheet-feed document scanner in accordance with the second aspect of the invention comprises a body 56 and lid 58. The body 56 contains three CCD-based cameras 60, 62 and 64, lower pinch rollers, of which one is denoted by reference numeral 66, motor 68 operable to drive the lower pinch rollers, and two fluorescent tubes 70 for illuminating a document as it is scanned.

The lid contains upper pinch rollers, one of which is denoted by reference numeral 72, which engage with the lower pinch rollers or a document as it is scanned. A direction of feed of a document as it is scanned is indicated by the arrow 74 of FIG. 4.

In FIG. 3 the document scanner is shown connected to a programmed computer 76 containing a microprocessor operable to process image data from the cameras 60, 62 and 64 in accordance with the method of the first aspect of the invention.

While the invention has been described with reference to one preferred embodiment, it is to be clearly understood by those skilled in the art that the invention is not limited thereto.

Rather, the scope of the invention is to be interpreted only in conjunction with the appended claims.

The invention claimed is:

1. A document scanning method for producing image data from a document from which data an image of the document can be produced, the method comprising the steps of causing relative movement between a document and both of first and second imaging elements at the same time, such that each of a succession of scan lines of the document is exposed in turn to the imaging elements; generating by means of the first and second imaging elements respective first and second image data words representative of respective first and second overlapping portions of each scan line, the first and second image data words being one-dimensional strings of pixel values; and concatenating at least a portion of each of the first and second words to generate a third image data word representative of the scan line, the third image data word being a one-dimensional string of pixel values, the method further including the steps of cross-correlating at least a portion of each of the first and second words to identify a portion of the second word that is included in the first word; discarding a portion of at least one of the first and second words; concatenating the first word or remainder thereof with the second word or remainder thereof to form the third image data word; and, if necessary, compressing or expanding the third word by linear interpolation so as to obtain an image data word of a predetermined length.

2. A method according to claim 1, wherein the step of cross-correlating at least a portion of each of the first and second words consists of cross-correlating a terminal portion of the first word with an initial portion of the second word, said terminal portion of the first word and initial portion of the second word including image data representative of an overlap of the first and second overlapping portions of a scan line.

3. A method according to claim 1, wherein the steps of discarding a portion of at least one of the first and second words and concatenating the first word or remainder thereof with the second word or remainder thereof to form the third image data word consist of discarding a terminal portion of the first word and an initial portion of the second word, said terminal portion of the first word being substantially representative of a first half of the overlap of the first and second overlapping portions of the scan line, and said initial portion of the second word being substantially representative of a second half of the overlap of the first and second overlapping portions of the scan line, and concatenating the remainder of the first word with the remainder of the second word to form the third image data word.

4. A method according to claim 1, further comprising the step, after identifying the portion of the second word that is included in the first word, of determining whether the length of said portion exceeds a predetermined value, which indicates that a spurious correlation has occurred, and if so, discarding a portion of at least one of the first and second words of a default length.

5. A method according to claim 4, further comprising the steps, after identifying the portion of the second word that is included in the first word and determining that the length of said portion does not exceed the predetermined value, of subtracting the length of said portion from said default length to generate an offset value, determining a running average of the offset value and the offset values of any preceding scan lines, rounding the running average to the nearest integer, if necessary, and discarding a terminal portion of the first word and an initial portion of the second word of a length equal to one half of the sum of the rounded running average and default length.

6. A document scanner having first and second imaging elements, a scanning mechanism and a microprocessor, the microprocessor being operable to control the scanning mechanism and process image data from the first and second imaging elements to perform a document scanning method according to claim 1.

7. A document scanner according to claim 6, wherein the microprocessor is contained in the document scanner.

8. A document scanner according to claim 6, wherein the microprocessor forms part of a programmed computer and the document scanner is operable to transmit the first and second words from the imaging elements to the computer and to receive the third image data words and control data from the computer.

* * * * *